(12) United States Patent
Lindenthal et al.

(10) Patent No.: US 12,145,414 B2
(45) Date of Patent: Nov. 19, 2024

(54) METHOD TO DETERMINE VEHICLE PAYLOAD, TRAILER TONGUE WEIGHT, AND RIDE HEIGHT USING UNDERBODY CAMERAS

(71) Applicant: GM GLOBAL TECHNOLOGY OPERATIONS LLC, Detroit, MI (US)

(72) Inventors: Steffen P Lindenthal, Oshawa (CA); Avesta Goodarzi, Whitby (CA); Utkarsh Saini, Pickering (CA); Christopher Andrew Stanek, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 18/063,208

(22) Filed: Dec. 8, 2022

(65) Prior Publication Data

US 2024/0190198 A1 Jun. 13, 2024

(51) Int. Cl.
*B60G 17/019* (2006.01)

(52) U.S. Cl.
CPC ...... *B60G 17/019* (2013.01); *B60G 2400/252* (2013.01); *B60G 2401/142* (2013.01); *B60G 2500/30* (2013.01)

(58) Field of Classification Search
CPC ............ B60G 17/019; B60G 2400/252; B60G 2401/142; B60G 2500/30
See application file for complete search history.

*Primary Examiner* — Mathew Franklin Gordon
(74) *Attorney, Agent, or Firm* — Lorenz & Kopf LLP

(57) ABSTRACT

In exemplary embodiments, methods and systems are provided that include one or more underbody cameras and a processor for a vehicle. The underbody cameras are configured to obtain camera images under the vehicle. The processor is coupled to the one or more underbody cameras, and is configured to at least facilitate: performing image processing for the camera images; and determining a ride height, a measure of weight on the vehicle, or both, based on the camera images from the one or more underbody cameras and the processing thereof via the processor.

20 Claims, 7 Drawing Sheets

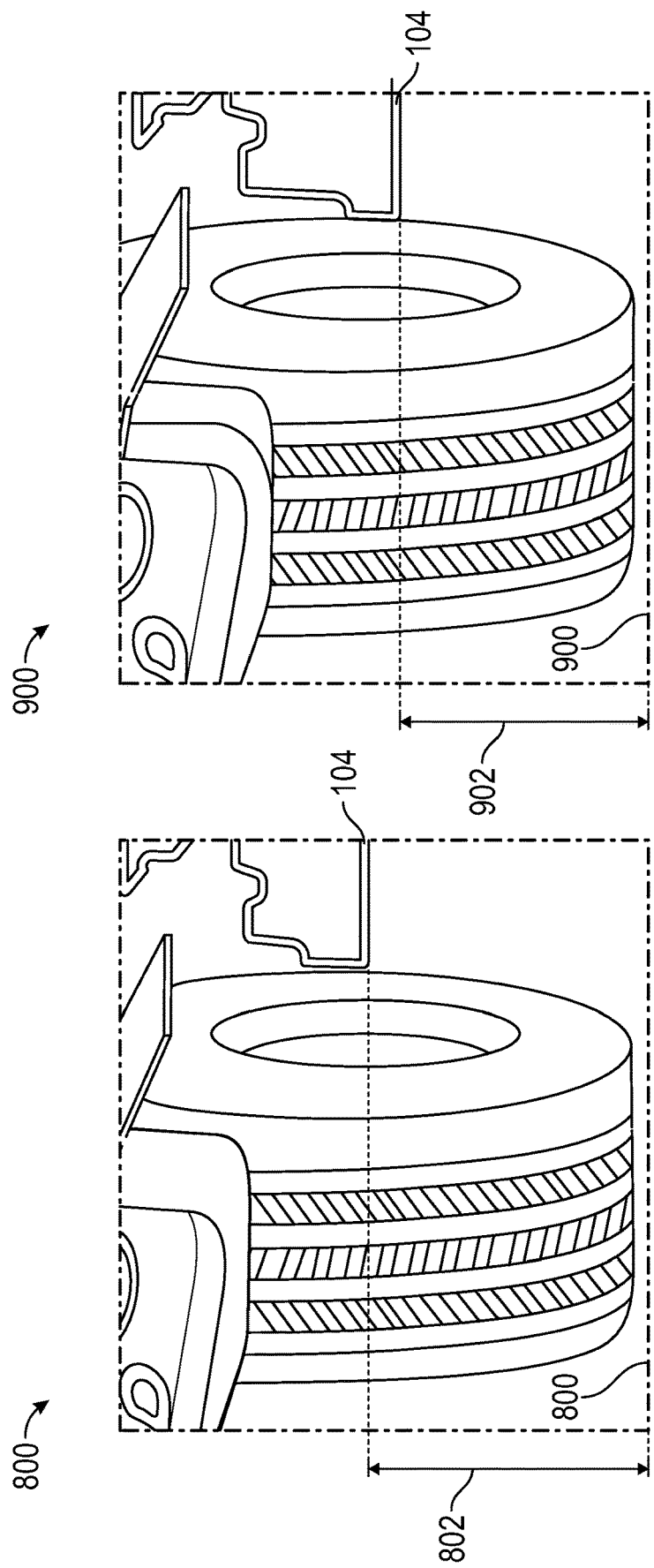

METHOD TO DETERMINE VEHICLE PAYLOAD, TRAILER TONGUE WEIGHT, AND RIDE HEIGHT USING UNDERBODY CAMERAS

INTRODUCTION

The technical field generally relates to vehicles and, more specifically, to methods and systems for determining ride height, vehicle payload, and tongue weight for a vehicle connected to a trailer.

Certain vehicles today are equipped to tow a trailer. However, in certain circumstances a vehicle towing a trailer may experience a greater than optimal trailer height, vehicle payload, and/or trailer tongue weight.

Accordingly, it is desirable to provide improved methods and systems for determining a ride height, a vehicle payload, a trailer tongue weight, or both, for a vehicle towing a trailer. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes: obtaining camera images from one or more underbody cameras of a vehicle; performing image processing for the camera images, via a processor of the vehicle; and determining a ride height, a measure of weight on the vehicle, or both, via the processor, based on the camera images from the one or more underbody cameras and the processing thereof via the processor.

Also in an exemplary embodiment, the method further includes controlling a vehicle action, via instructions provided by the processor, based on the determining of the ride height, the measure of weight on the vehicle, or both.

Also in an exemplary embodiment, the camera images include: front camera images obtained from a front underbody camera of the vehicle and capturing a front axle of the vehicle; and rear camera images obtained from a rear underbody camera of the vehicle and capturing a rear axle of the vehicle.

Also in an exemplary embodiment, the method further includes: determining, via the processor, a front suspension displacement from the processing of the front camera images; and determining, via the processor, a rear suspension displacement from the processing of the rear camera images; wherein the step of determining the measure of weight on the vehicle includes differentiating between a payload weight and a tongue weight for the vehicle based on the front suspension displacement and the rear suspension displacement.

Also in an exemplary embodiment, the method further includes: obtaining additional sensor data from one or more additional sensors of the vehicle; wherein the image processing is performed via the processor using the additional sensor data in combination with the camera images.

Also in an exemplary embodiment, the method further includes performing a health check for the one or more underbody cameras, via the processor, based on a comparison of the camera images, as processed via the processor, with one or more baseline images stored in a computer memory.

Also in an exemplary embodiment, the method further includes: performing, via the processor, vehicle frame extraction using the camera images and a baseline image stored in memory, as part of the processing of the camera images; performing, via the processor, tire ground patch extraction using the camera images, also as part of the processing of the camera images; and calculating, via the processor, a height between a frame of the vehicle and the tire ground patch based on the vehicle frame extraction and the tire ground patch extraction; wherein the measure of weight on the vehicle is determined using the height between the frame of the vehicle and the tire ground patch.

In another exemplary embodiment, a system is provided that includes: one or more underbody cameras for a vehicle and configured to obtain camera images under the vehicle; and a processor for the vehicle, the processor coupled to the one or more underbody cameras and configured to at least facilitate: performing image processing for the camera images; and determining a ride height, a measure of weight on the vehicle, or both, based on the camera images from the one or more underbody cameras and the processing thereof via the processor.

Also in an exemplary embodiment, the processor is configured to at least facilitate controlling a vehicle action, via instructions provided by the processor, based on the determining of the ride height, the measure of weight on the vehicle, or both.

Also in an exemplary embodiment, the one or more underbody cameras include: a front underbody camera of the vehicle configured to obtain front camera images capturing a front axle of the vehicle; and a rear underbody camera of the vehicle configured to obtain rear camera images capturing a rear axle of the vehicle.

Also in an exemplary embodiment, the processor is further configured to at least facilitate: determining a front suspension displacement from the processing of the front camera images; determining a rear suspension displacement from the processing of the rear camera images; and differentiating between a payload weight and a tongue weight for the vehicle based on the front suspension displacement and the rear suspension displacement.

Also in an exemplary embodiment, the system further includes: one or more additional sensors configured to obtain additional sensor data; wherein the processor is further coupled to the one or more additional sensors and is further configured to at least facilitate performing the image processing using the additional sensor data in combination with the camera images.

Also in an exemplary embodiment, the processor is further configured to at least facilitate performing a health check for the one or more underbody cameras, based on a comparison of the camera images, as processed via the processor, with one or more baseline images stored in a computer memory.

Also in an exemplary embodiment, the processor is further configured to at least facilitate: performing vehicle frame extraction using the camera images and a baseline image stored in memory, as part of the processing of the camera images; performing tire ground patch extraction using the camera images, also as part of the processing of the camera images; calculating a height between a frame of the vehicle and the tire ground patch based on the vehicle frame extraction and the tire ground patch extraction; and determining the measure of weight on the vehicle using the height between the frame of the vehicle and the tire ground patch.

In another exemplary embodiment, a vehicle is provided that includes: a body configured to be coupled to a trailer; a drive system configured to move the body; one or more underbody cameras configured to obtain camera images under the vehicle; and a processor coupled to the one or more underbody cameras and configured to at least facilitate: performing image processing for the camera images; and determining a ride height, a measure of weight on the vehicle, or both, based on the camera images from the one or more underbody cameras and the processing thereof via the processor.

Also in an exemplary embodiment, the processor is configured to at least facilitate controlling a vehicle action, via instructions provided by the processor, based on the determining of the ride height, the measure of weight on the vehicle, or both.

Also in an exemplary embodiment, the vehicle further includes: a front axle; and a rear axle; wherein the one or more underbody cameras include: a front underbody camera configured to obtain front camera images capturing the front axle; and a rear underbody camera configured to obtain rear camera images capturing the rear axle.

Also in an exemplary embodiment, the processor is further configured to at least facilitate: determining a front suspension displacement from the processing of the front camera images; determining a rear suspension displacement from the processing of the rear camera images; and differentiating between a payload weight and a tongue weight for the vehicle based on the front suspension displacement and the rear suspension displacement.

Also in an exemplary embodiment, the processor is further configured to at least facilitate performing a health check for the one or more underbody cameras, based on a comparison of the camera images, as processed via the processor, with one or more baseline images stored in a computer memory.

Also in an exemplary embodiment, the processor is further configured to at least facilitate: performing vehicle frame extraction using the camera images and a baseline image stored in memory, as part of the processing of the camera images; performing tire ground patch extraction using the camera images, also as part of the processing of the camera images; calculating a height between a frame of the vehicle and the tire ground patch based on the vehicle frame extraction and the tire ground patch extraction; and determining the measure of weight on the vehicle using the height between the frame of the vehicle and the tire ground patch.

DESCRIPTION OF THE DRAWINGS

The present disclosure will hereinafter be described in conjunction with the following drawing figures, wherein like numerals denote like elements, and wherein:

FIGS. 8 and 9 depict exemplary illustrations of a wheel attached to the vehicle in accordance with exemplary implementations of the process of FIG. 2, in which the vehicle is relatively unloaded versus loaded, respectively, in accordance with exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
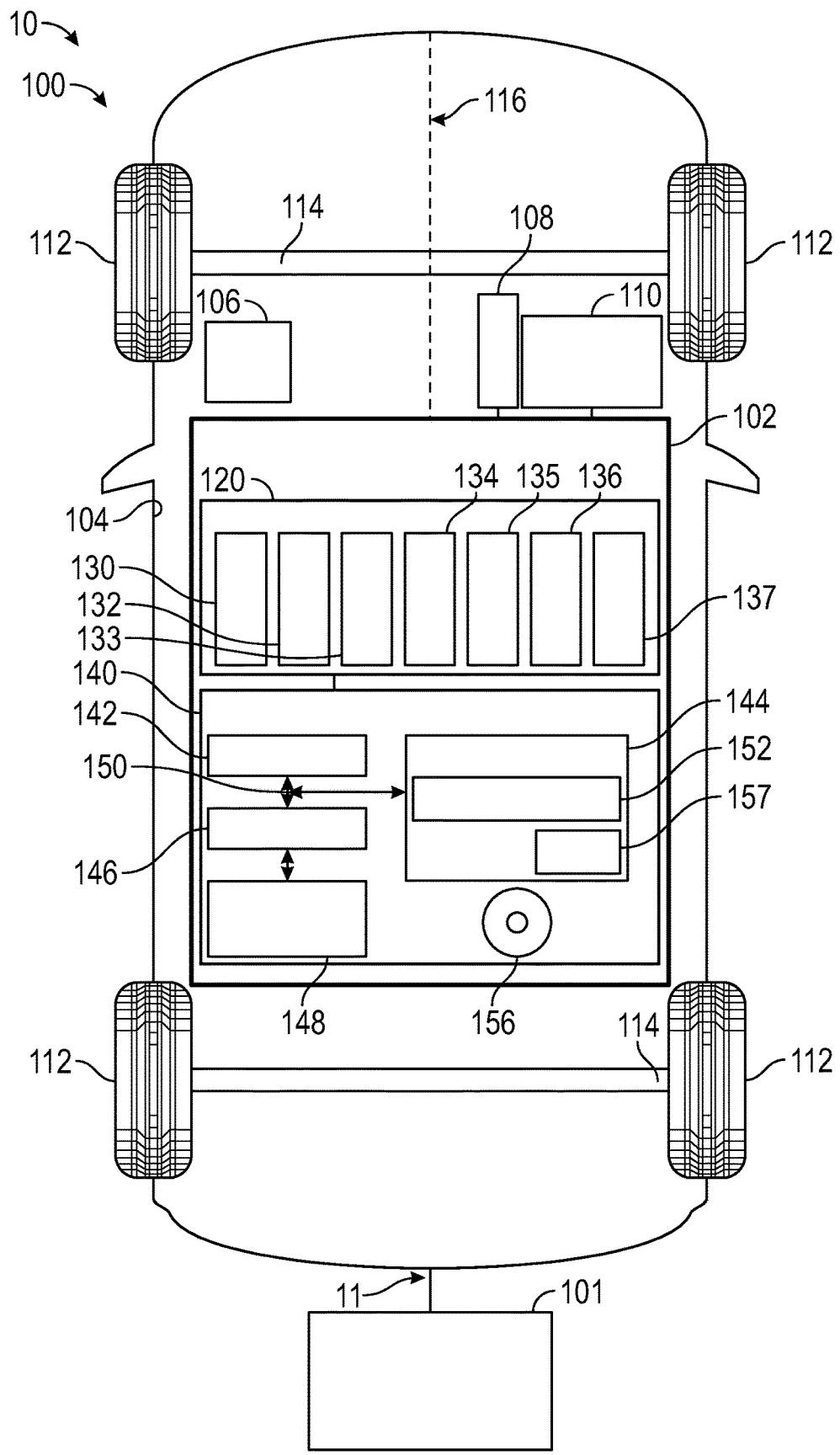
FIG. 1 is a functional block diagram of a vehicle assembly that includes a vehicle and a trailer, and in which the vehicle includes underbody cameras along with a control that uses camera images from the underbody cameras for determining ride height, a vehicle payload and a trailer tongue weight of the vehicle while towing the trailer.

FIG. 1 illustrates a vehicle assembly 10 that includes a vehicle 100 and a trailer 101 that are coupled together via a connection 11 (also referred to as a "hitch" 11), according to an exemplary embodiment. In various embodiments, the vehicle 100 is configured to tow the trailer 101 when the vehicle 100 and the trailer 101 are coupled via the connection 11 (i.e., hitch 11).

As described in greater detail further below, the vehicle 100 includes a plurality of underbody cameras 130, 132 along with a control system 102 that is configured to determine a ride height and a payload weight for the vehicle 100 as well as a tongue weight at the connection 11 while the vehicle 100 is towing the trailer 101, in accordance with exemplary embodiments. Specifically, as explained in greater detail further below in connection with the process 200 of FIG. 2 (and the sub-processes of FIGS. 3, 4, and 6, and the implementations of FIGS. 5, 7, 8, and 9), in various embodiments the control system 102 utilizes camera images from the underbody cameras 130, 132 along with other sensor data from a sensor array 120 to determine a ride height and a payload weight for the vehicle 100 as well as a tongue weight at the connection 11 while the vehicle 100 is towing the trailer 101.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

Also in various embodiments, the trailer 101 may comprise any number of different types of trailers and/or other types of mobile platforms, for example that are coupled to the vehicle 100 and move along with the vehicle 100. In addition, in various embodiments, the connection 11 comprises a hitch having one or more wiring harnesses such as a 7-pin connector; however, this may vary in other embodiments.

As depicted in FIG. 1, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In various embodiments, the axles 114 may include any number of front axles and any number of rear axles. In various embodiments, the drive system 110 comprises a propulsion system. In various embodiments, the drive system 110 comprises one or more combustion engines and/or electric motor, with a transmission thereof. In certain embodiments, the drive system 110 (also referred to herein as the propulsion system 110) may vary, and for example may also include one or more other types of motors, engines, and/or systems.

As depicted in FIG. 1, the vehicle also includes a braking system 106. In exemplary embodiments, the braking system 106 controls braking of the vehicle 100 using braking components that are controlled via inputs provided by a driver, such as a brake pedal and/or via automatic control via the control system 102 (for example, with braking requested by the drive system 110 and/or the control system 102). In certain embodiments, the braking system 106 may also control braking of the trailer 101.

As depicted in FIG. 1, the vehicle 100 also includes a steering system 108. In exemplary embodiments, the braking system 106 controls braking of the vehicle 100 using braking components that are controlled via inputs provided by a driver, such as a brake pedal and/or via automatic control via the control system 102 (for example, with braking requested by the drive system 110 and/or the control system 102). In certain embodiments, the braking system 106 may also control braking of the trailer 101.

In the embodiment depicted in FIG. 1, the control system 102 is coupled to the braking system 106, the steering system 108, and the drive system 110. In various embodiments, the control system 102 may also be coupled to one or more other systems and/or components of the vehicle 100 and/or the trailer 101. Also as depicted in FIG. 1, in various embodiments, the control system 102 includes a sensor array 120 and a controller 140.

In various embodiments, the sensor array 120 includes various sensors that obtain sensor data for use in determining the ride height and the payload weight and tongue weight for the vehicle 100 as the vehicle 100 is towing the trailer 101, among other potential functionality for the vehicle 100 and/or the trailer 101. In the depicted embodiment, the sensor array 120 includes the above-mentioned underbody cameras 130, 132, as well as one or more speed sensors 133, transmission sensors 134, hitch sensors 135, and tire sensors 136. In certain embodiments, the sensor array 120 may also include one or more other sensors 137.

In various embodiments, the underbody cameras 130, 132 are disposed on an underbody of the vehicle 100, beneath the body 104. In various embodiments, the underbody cameras 130, 132 include one or more front underbody cameras 130 (disposed under the body 104 in a front portion of the vehicle 100) along with one or more rear underbody cameras 132 (disposed under the body 104 in a rear portion of the vehicle 100). In various embodiments, both the front and rear underbody cameras 130, 132 capture camera images underneath the body 104 of the vehicle 100, including the chassis and suspension of the vehicle 100 and the ground of a roadway underneath the vehicle 100.

In various embodiments, the speed sensors 133 measure an amount of speed (and/or changes thereof) of the vehicle 100. In certain embodiments, the speed sensors 133 comprise wheel speed sensors that measure a speed of one or more of the wheels 112 of the vehicle 100. In certain other embodiments, the speed sensors 133 may comprise one or more accelerometers and/or one or more other types of sensors that measure parameters pertaining to movement of the vehicle 100.

In various embodiments, the transmission sensors 134 (or gear sensors) detect a current transmission state or gear of the vehicle (e.g., park, reverse, neutral, and drive).

Also in various embodiments, the hitch sensors 135 measure a connection status of the trailer 101 with the vehicle 100 (e.g., including as to whether the trailer 101 is hitched to the vehicle 100 via the connection 11).

In various embodiments, the tire sensors 136 comprise one or more sensors that are coupled to or proximate one or more of the wheels 112 and/or tires associated thereof, and measure tire pressure and/or one or more other parameters pertaining to the tires.

In addition, in various embodiments, the one or more other sensors 137 include one or more inertial measurements unit (IMU) sensors, detection sensors (e.g., other cameras, Lidar, sonar, radar, or the like) and/or one or more other sensors configured to obtain sensor data as to one or more other parameters pertaining to the vehicle 100, operation thereof, and/or the roadway in which the vehicle 100 is travelling, such as the slope of the roadway and various parameters as to the underbody cameras 130, 132 (e.g., including the installation position and orientation of the underbody cameras 130, 132, such as the pitch, roll, and the heading, and including the pixel size, number of pixels, and focal length of the underbody cameras 130, 132).

In various embodiments, the controller 140 is coupled to the sensor array 120, as well as to the braking system 106, the steering system 108, and the drive system 110 of the vehicle 100. In certain embodiments, the controller 140 may also be coupled to one or more other components of the vehicle 100 and/or to the trailer 101.

In various embodiments, the controller 140 receives sensor data from the sensor array 120 (including camera images from the underbody cameras 130, 132 as well as additional sensor data from other sensors of the sensor array 120), processes the sensor data, and determines the ride height, the payload weight, and the tongue weight for the vehicle 100 when the vehicle 100 is towing the trailer 101. In various embodiments, the controller 140 performs these functions in accordance with the process 200 of FIG. 2, along with the subprocesses and implementations thereof of FIGS. 3-9, and as described in greater detail in connection therewith. In addition, in certain embodiments, the controller 140 may also control braking, steering, acceleration, and/or other vehicle functionality via the braking system 106, steering system 108, drive system 110, and/or other systems, devices, and/or components of the vehicle 100 and/or the trailer 101.

In various embodiments, the controller 140 comprises a computer system (and is also referred to herein as computer system 140), and includes a processor 142, a memory 144, an interface 146, a storage device 148, and a computer bus 150. In various embodiments, the controller (or computer system) 140 controls vehicle operation, including the determining of the ride height, the payload weight, and the tongue weight for the vehicle 100 when the vehicle 100 is towing the trailer 101, in accordance with the process 200 of FIG. 2, along with the subprocesses and implementations thereof of FIGS. 3-9, and as described in greater detail in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and the subprocesses and implementations of FIGS. 3-9 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 157, including for control of the trailer 101 based on the processing of the sensor data that is obtained from the sensor array 120.

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and the subprocesses and implementations of FIGS. 3-9 and as described further below in connection therewith. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
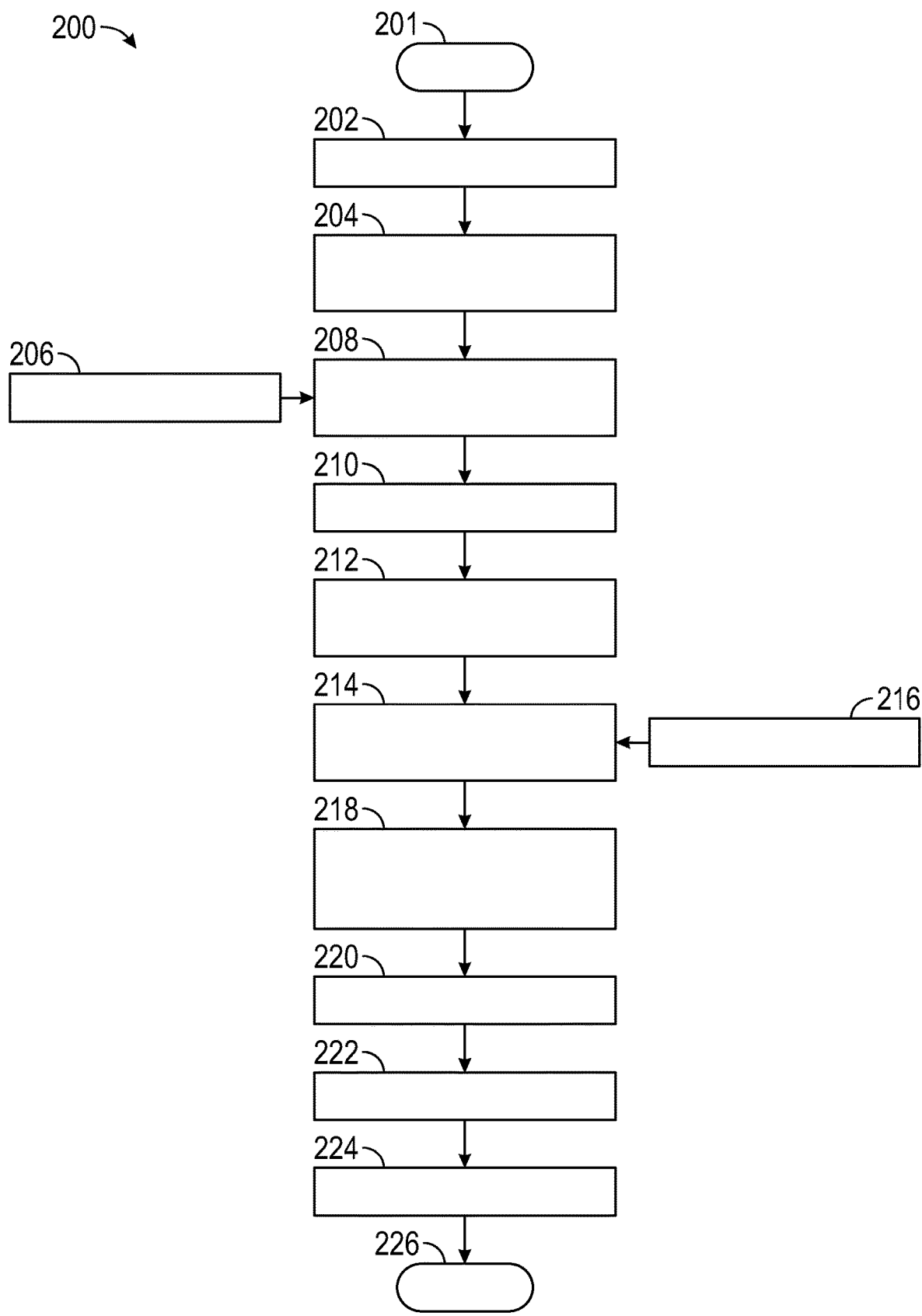
FIG. 2 is a flowchart of a process for determining ride height, a vehicle payload and a trailer tongue weight of a vehicle towing a trailer, and that can be implemented in connection with the vehicle assembly, including the vehicle, the trailer, and the control system of FIG. 1, in accordance with exemplary embodiments.

FIG. 2 provides a flowchart of process 200 for determining a ride height, a vehicle payload, and a trailer tongue weight of a vehicle towing a trailer, in accordance with exemplary embodiments. Also in exemplary embodiments, the process 200 can be implemented in connection with the vehicle assembly 10, including the vehicle 100 and the control system 102 thereof, and the trailer 101. The process 200 is described below with reference to FIG. 2 as well as to FIGS. 3-9, which depict exemplary sub-processes and implementations of the process 200 as set forth further below.

As depicted in FIG. 2, the process 200 begins at step 201. In one embodiment, the process 200 begins when a vehicle is turned "on" or begins operation, for example during a current vehicle drive. For example, in various embodiments, the process 200 may also begin when a driver approaches or enters the vehicle 100, or when the driver turns on the vehicle and/or a driver system or motor therefor (e.g. by turning a key, engaging a keyfob or start button, and so on).

In one embodiment, the steps of the process 200 are performed continuously during operation of the vehicle.

Sensor data is obtained at steps 202 and 204. In various embodiments, sensor data is obtained via each of the sensors of the vehicle's sensor array 120 of FIG. 1.

In certain embodiments, the sensor data of step 202 includes sensor data as to the health and status of the underbody cameras 130, 132, as well as the operation of the vehicle 100 and the roadway on which the vehicle 100 is travelling. In certain embodiments, the sensor data of step 202 includes the following, among other possible sensor data: vehicle speed from the speed sensors 133; transmission gear status from the transmission sensors 134; connection status of the vehicle 100 and the trailer 101 from the hitch sensors 135; tire pressure from the tire sensors 136; road slope and installation position and orientation of the underbody cameras 130, 132.

Also in various embodiments, underbody camera images are obtained during step 204. In various embodiments, during step 204, camera images are obtained from both the front underbody cameras 130 and the rear underbody cameras 132 of FIG. 1. In various embodiments, the camera images include images underneath the body 104 of the vehicle 100, including the chassis and suspension of the vehicle 100 and the ground of a roadway underneath the vehicle 100.

In various embodiments, a determination is made as to whether enabling conditions are satisfied (step 206). In various embodiments, during step 206, a determination is made as to whether certain enabling conditions are met for the process 200 to continue. In certain embodiments, the enabling conditions include the following, among other possible enabling conditions: (i) that the vehicle speed is less than a predetermined speed threshold; (ii) that the trailer is connected to the vehicle; (iii) that the road slope is less than a predetermined slope threshold; and (iv) that the tire pressure is greater than a predetermined pressure threshold. In various embodiments, these determinations are made by the processor 142 of FIG. 1 based on the sensor data of steps 202 and 204.

In various embodiments, the process 200 proceeds to step 208 (described below) only when it is determined that each of the enabling conditions are satisfied. In various embodiments, once the enabling conditions are satisfied, the processor 142 of FIG. 1 automatically activates the remainder of the process 200 (beginning with step 208) for determining the ride height, the payload weight, and the tongue weight for the vehicle 100, as described below.

In various embodiments, once it is determined that each of the enabling conditions are satisfied, a load monitoring algorithm is loaded (step 208). In various embodiments, the load monitoring algorithm comprises and/or is part of one of the programs 152 stored in the computer memory 144, and is retrieved from the computer memory 144 by the processor 142.

In various embodiments, image processing is initiated (step 210). In various embodiments, the image processing is initiated via the load monitor enabling algorithm in accordance with instructions provided by the processor 142. Also in various embodiments, once the image processing is initiated, processed underbody images 212 are generated.

Also in various embodiments, pixel to displacement calculations are made (step 214). In various embodiments, calculations are made by the processor 142 of FIG. 1 as to displacement of pixels in the images from the underbody cameras. Specifically, in various embodiments, the calculations are made with respect to the processed underbody images 212 using various camera parameters 216 from the sensor data with respect to the underbody cameras 130, 132 of FIG. 1, including: (i) installation position; (ii) orientations (including pitch, roll, and heading), pixel size, number of pixels, and focal length.

In various embodiments, suspension displacement and force characteristics are determined (step 218). In various embodiments, the suspension displacement and force characteristics are determined by the processor 142 using the processed underbody images 212 as well as the pixel to displacement calculations of step 214, as set forth in greater detail below in accordance with an exemplary embodiment. In various embodiments, camera images from the front underbody cameras 130 are utilized for determining front suspension displacement, whereas camera images from the rear underbody cameras 132 are utilized for determining rear suspension displacement.

Figure 3:
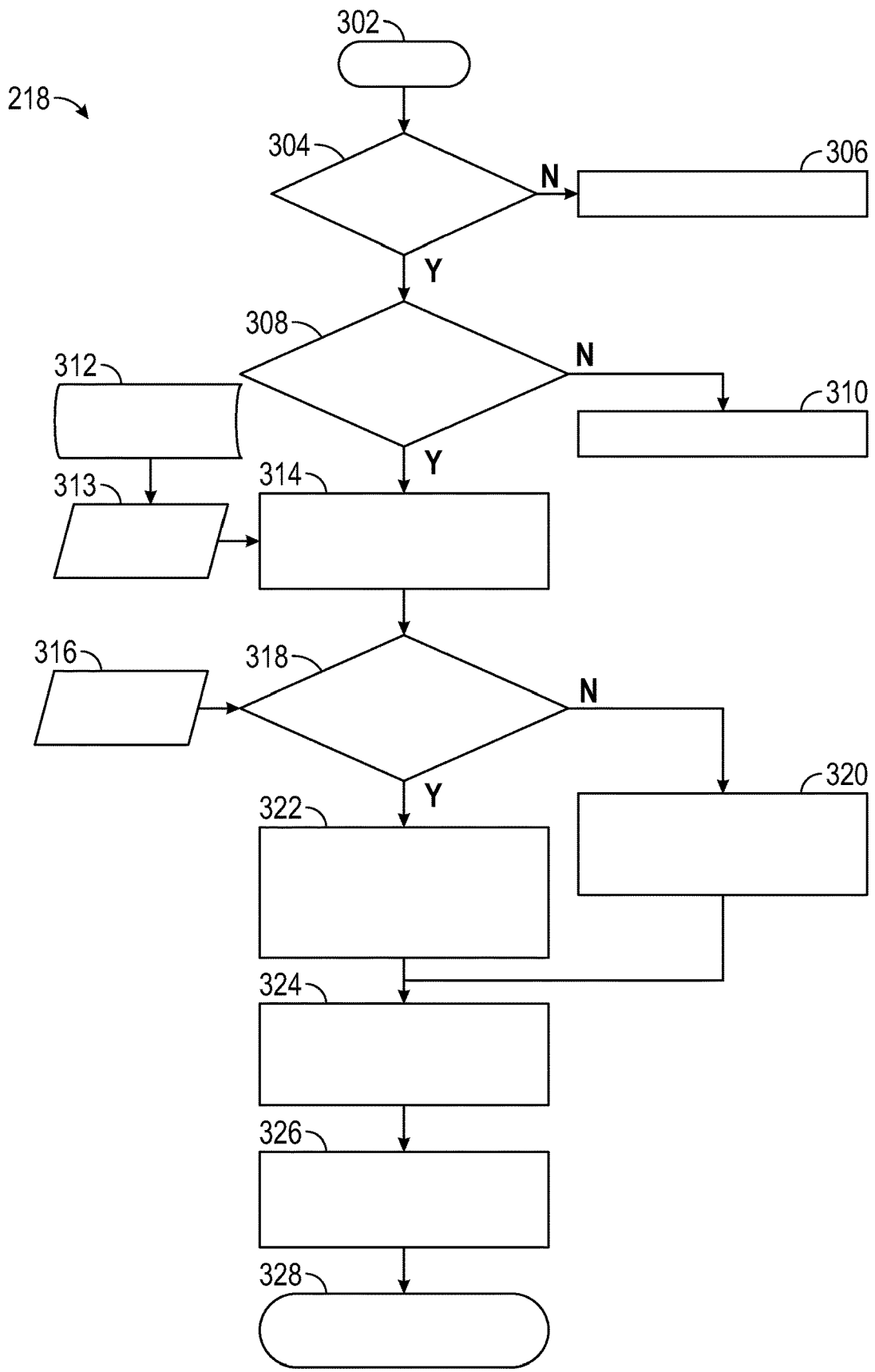
FIG. 3 is a flowchart of a sub-process corresponding to a step of the process of FIG. 2, namely of determining suspension displacement and force characteristics for the vehicle, in accordance with exemplary embodiments.

With reference to FIG. 3, a flowchart is provided for a sub-process corresponding to step 218 of FIG. 2, namely: the determining of suspension displacement and force characteristics for the vehicle, in accordance with exemplary embodiments.

As depicted in FIG. 3, in various embodiments, this sub-process 218 begins at step 302, for example after the image processing is initiated.

With continued reference to FIG. 3, in various embodiments a determination is made as to whether the vehicle is stationary (step 304). In various embodiments, this determination is made by the processor 142 of FIG. 1 based on the sensor data of step 202.

In various embodiments, when it is determined in step 304 that the vehicle is not stationary, then the process 200 (or features pertaining thereto for determining vehicle ride height, vehicle payload weight and tongue weight) are disabled (step 306), in accordance with instructions provided by the processor 142. Conversely, also in various embodiments, when it is instead determined in step 304 that the vehicle is stationary, then the process proceeds instead to step 308, described below.

In various embodiments, during step 308, a determination is made as to whether the underbody cameras are healthy. In various embodiments, this determination is made by the processor 142 of FIG. 1 based on the camera images and the additional sensor data of steps 202 and 204. In various embodiments, the processor 142 determines whether the underbody cameras are health based on a comparison of the current images, as processed in the process 200 via the processor 142 of FIG. 1, with one or more baseline (or reference) camera images that are stored in the memory 144 of FIG. 1 as stored values thereof.

In various embodiments, when it is determined in step 308 that one or more of the underbody cameras are not healthy, then the process 200 (or features pertaining thereto for determining vehicle ride height, vehicle payload weight, and tongue weight) are disabled (step 310), in accordance with instructions provided by the processor 142. Conversely, also in various embodiments, when it is instead determined in step 308 that the underbody cameras are healthy, then the process proceeds instead to steps 312-314, described below.

In various embodiments, during step 312, camera video feeds are obtained. In various embodiments, video feeds from the underbody cameras 130, 132 of FIG. 1 are obtained. In various embodiments, these video feeds are obtained by the processor 142 of FIG. 1 for processing.

In various embodiments, during step 313, camera images are obtained. In various embodiments, the video feeds from step 312 are utilized in obtaining still camera images from the underbody cameras 130, 132 during step 313. In certain embodiments, this is performed via the processor 142 and/or directly via the underbody cameras 130, 132.

Also in various embodiments, vehicle frame heights and pixel frame heights are calculated (step 314). In various embodiments, the vehicle frame heights and pixel frame heights are calculated via the processor 142 using the camera images of step 313.

Figure 4:
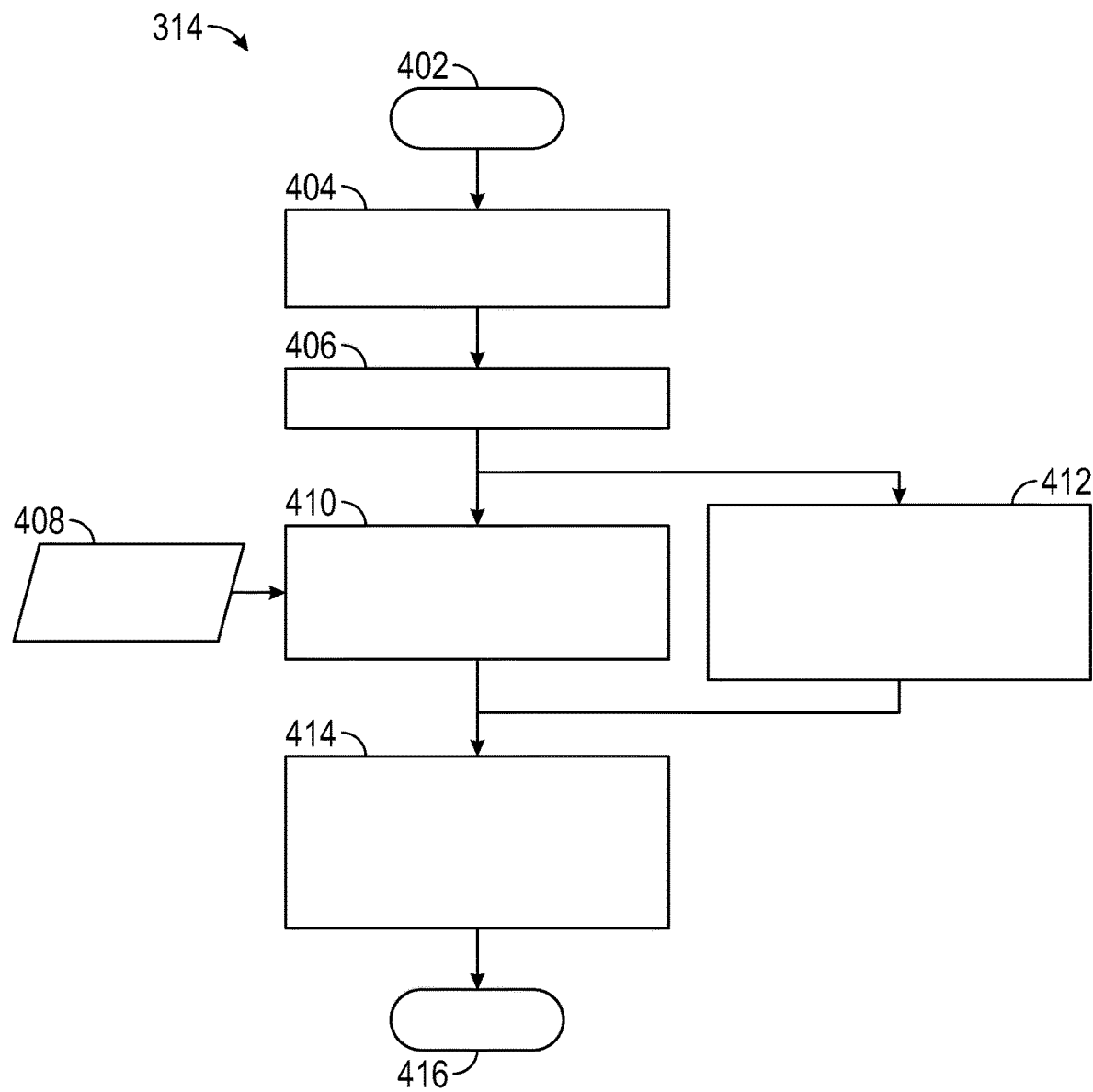
FIG. 4 is a flowchart of a sub-process corresponding to a step of the sub-process of FIG. 3, namely of determining a vehicle frame height, in accordance with exemplary embodiments.

With reference to FIG. 4, a flowchart is provided for a sub-process corresponding to step 314 of FIG. 3, namely, the calculation of the vehicle frame height.

As depicted in FIG. 4, in various embodiments, this sub-process 314 begins at step 402, for example after the still camera images are obtained in step 313.

With continued reference to FIG. 4, in various embodiments contrast enhancement is performed (step 404). In various embodiments, a histogram stretch is performed for the still camera images with respect to any edges of the cameras images that are visible. In various embodiments, this is performed by the processor 142 of FIG. 1.

Also in various embodiments, vehicle frame extraction (step 410) and tire ground patch extraction (step 412) are both performed, as described below.

In various embodiments, the vehicle frame extraction of step 410 is performed using a reference image 408. In certain embodiments, the reference image 408 comprises a baseline or reference image of the underbody cameras that is stored in the memory 144 of FIG. 1 (e.g., as a stored value 157 thereof). Also in various embodiments, the edges in an identified region of interest of a current camera image are correlated with the reference image 408. In various embodiments, this is performed by the processor 142 of FIG. 1.

In addition, in various embodiments, the tire ground patch extraction is performed within a certain region of the current camera image as to a region of or surrounding points of contact between the tire and the road in which the vehicle is travelling. In various embodiments, a straight line is selected of a certain width within this region of interest and is utilized in the tire ground patch extraction. In various embodiments, this is performed by the processor 142 of FIG. 1.

In various embodiment, a vehicle frame height is calculated (step 414). In various embodiments, the vehicle frame height is calculated by the processor 142 between the vehicle frame (e.g., body) and tire ground patch in pixels using the vehicle frame extraction of step 410 and the tire ground patch extraction of step 412. In various embodiments, the sub-process of FIG. 4 then terminates at 416, and the process returns to FIG. 3.

With reference back to FIG. 3, in various embodiments, the process obtains a calibratable value ("ε") (step 316), and a determination is made as to whether the vehicle frame height is greater than the calibratable value (step 318). In various embodiments, the calibratable value ("ε") is retrieved from the memory 144 of FIG. 1 as one of the stored values therein. Also in various embodiments, the processor 142 of FIG. 1 compares the frame height of step 414 with calibratable value ("ε") of step 318 in making the determination of step 318.

In various embodiments, if it is determined that the vehicle frame height is less than or equal to the calibratable value ("ε"), then the current image is stored (step 320). In various embodiments, the current image is stored, along with a coincident vehicle frame height value, in the memory 144 of FIG. 1. In various embodiments, the process then proceeds directly to step 324, described further below.

Conversely, in various embodiments, if it is instead determined that the vehicle frame height is greater than the calibratable value ("ε"), then the previous image (instead of the current image) (step 322). In various embodiments, the current image from a prior iteration of the process 200 (i.e., from a prior point in time) is stored, along with a coincident vehicle frame height value for that image, in the memory 144 of FIG. 1. In various embodiments, the process then proceeds directly to step 324, described further below.

In various embodiments, during step 324, a change in height is calculated. In various embodiments, the processor 142 of FIG. 1 calculates a change in the vehicle frame height from successive different underbody camera images at different points in time during the vehicle drive.

Figure 5:
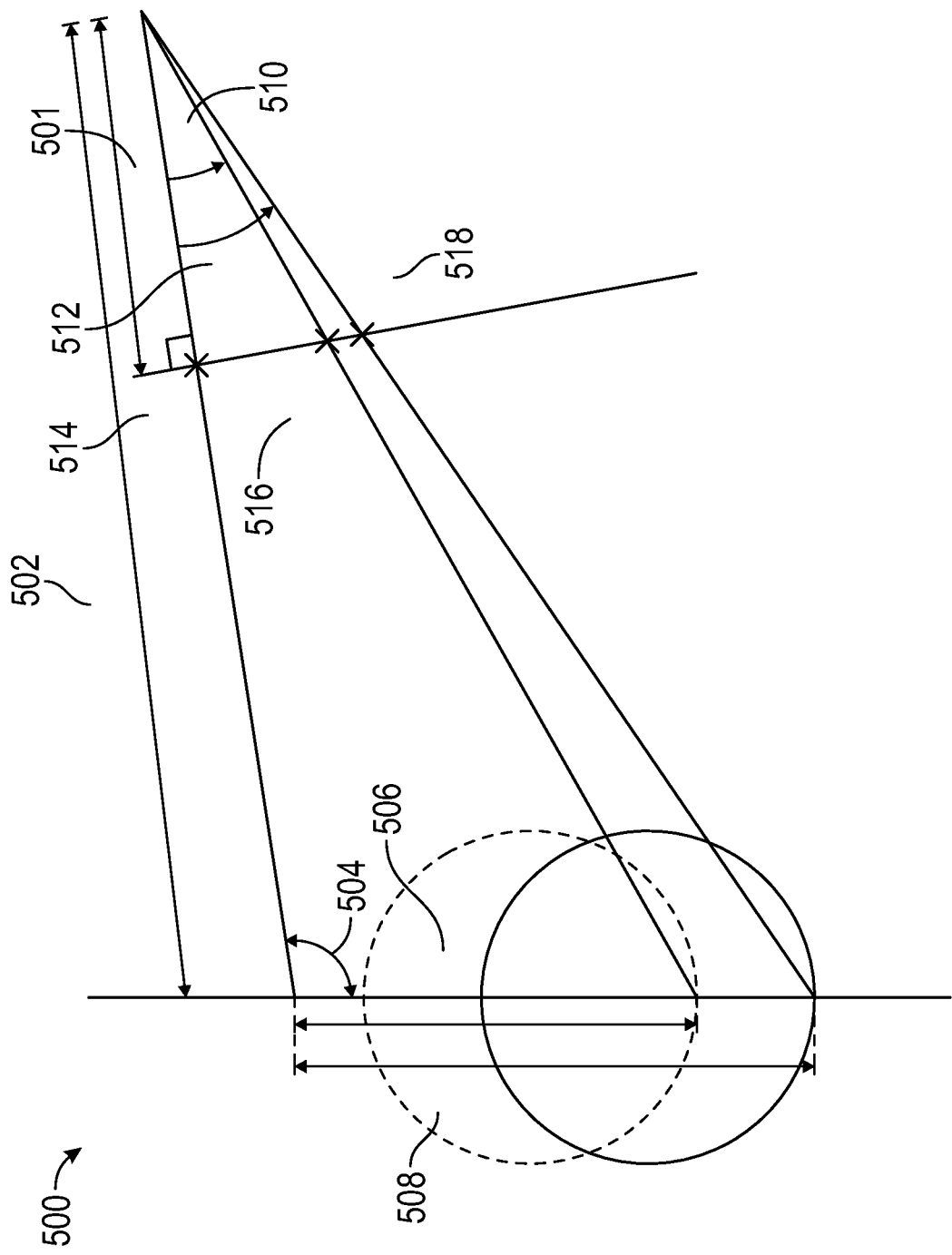
FIG. 5 depicts an implementation of the process of FIG. 2, including the sub-processes of FIGS. 3 and 4, in accordance with exemplary embodiments.

With reference now to FIG. 5, an exemplary graphical illustration 500 is provided corresponding to an exemplary implementation of the calculation of the change in height in step 324.

As depicted in FIG. 5, a focal length "f" 501 is provided. In various embodiments, the focal length "f" 501 represents the focal length for the camera from which the current camera image was obtained.

As illustrated in FIG. 5 in an exemplary embodiment, a distance "D" 502 is depicted. In certain embodiments, the distance "D" 502 comprises a three dimensional distance in object space between the camera location and a vertical line drawn through the vehicle axle's point (along which the vehicle moves up and down), as calculated from extrinsic parameters and vehicle dimensions.

Also as illustrated in FIG. 5, an angle "α" 504 is depicted. In certain embodiments, the angle "α" 504 comprises an intersection angle in object space of the camera's focal ray with the vertical line drawn through the vehicle axle's point (along which the vehicle moves up and down), as calculated from extrinsic parameters and vehicle dimensions.

Also as depicted in FIG. 5, point "$x_0$, $y_0$" 514 is also depicted, and in various embodiments comprises a location of the principal point in image space. Also depicted in FIG. 5 is another point "$x_1$, $y_1$" 516, which in various embodiments comprises observations in image space of where the tire meets the road at first time $t_1$. In addition, also depicted in FIG. 5 is an additional point "$x_2$, $y_2$" 518, which in various embodiments comprises observations in image space of where the tire meets the road at second time $t_2$ that is subsequent to the first time $t_1$.

Also depicted in FIG. 5 are additional angles "$\beta_1$" 510 and "$\beta_2$" 512. In various embodiments, angle "$\beta_1$" 510 comprises an angle between the principal ray and the image ray to where the tire meets the road in image space at first time "$t_1$". Also in various embodiments, angle "$\beta_2$" 512 comprises an angle between the principal ray and the image ray to where the tire meets the road in image space at second time "$t_2$" that is subsequent to the first time "$t_1$".

In various embodiments, angle "$\beta_1$" 510 is calculated in accordance with the following equation (Equation 1):

$$\beta_1 = \sin\left(\frac{\sqrt{(x_1 - x_0)^2 + (y_1 - y_0)^2}}{f}\right)$$

Also in various embodiments, angle "$\beta_2$" 512 is calculated in accordance with the following equation (Equation 2):

$$\beta_2 = \sin\left(\frac{\sqrt{(x_2 - x_0)^2 + (y_2 - y_0)^2}}{f}\right)$$

Also depicted in FIG. 5 are "$L_1$" 506 and "$L_2$" 508. In various embodiments, "$L_1$" 506 represents the vehicle height in object space at the above-referenced first time $t_1$. Likewise, also in various embodiments, "$L_2$" 508 represents the vehicle height in object space at the above-referenced second time $t_2$, subsequent to the first time $t_1$.

In various embodiments, the vehicle height "$L_1$" 506 in object space at the above-referenced first time $t_1$ is calculated in accordance with the following equation (Equation 3):

$$L_1 = D \cdot \frac{\sin(\beta_1)}{\sin(180° - \beta_1 - \alpha)}$$

Also in various embodiments, the vehicle height "$L_2$" 508 in object space at the above-referenced first time $t_2$ is calculated in accordance with the following equation (Equation 4):

$$L_2 = D \cdot \frac{\sin(\beta_2)}{\sin(180° - \beta_2 - a)}$$

Finally, the change vehicle height "$\Delta L$" in object space between the first time $t_1$ and the second time $t_2$ is calculated in accordance with the following equation (Equation 5):

$$\Delta L = L_2 - L_1$$

In various embodiments, the heights "L" refer to ride heights for the vehicle 100, and the change in vehicle height "$\Delta L$" refers to a change in ride height. In addition, also in various embodiments, the comparison of images in determining ride height (as well as the determining of other measures include vehicle payload and tongue weight) are made based on a comparison between different images of when the vehicle 100 is "unloaded" (i.e., with relatively less weight or cargo) versus "loaded" (i.e., with relatively greater weight or cargo).

With reference to FIGS. 8 and 9, in various embodiments, exemplary illustrations 800, 900 of a wheel 112 attached to the vehicle 100, in which the vehicle 100 is relatively unloaded (illustration 800 of FIG. 8) versus loaded (illustration 900 of FIG. 9), respectively, in accordance with exemplary embodiments. As shown in FIGS. 8 and 9, the unloaded vehicle 100 has a relatively larger ride height 802 of the body 104 from the ground 800 in FIG. 8, as compared with the relatively smaller ride height 902 of the body 104 from the ground 900 of FIG. 9 with respect to the loaded vehicle 100 of FIG. 9.

Also in various embodiments, the ride height 802 of the unloaded vehicle 100 of FIG. 8 corresponds to "$L_2$" with respect to Equation 5 above, whereas the ride height 902 of the loaded vehicle 100 of FIG. 9 corresponds to "$L_1$" in Equation 5. Likewise, in various embodiments, the difference between ride heights 802, 902 between the unloaded versus loaded vehicles 100 of FIGS. 8 and 9, respectively corresponds to "$\Delta L$" in Equation 5 above.

With reference back to FIG. 3, also in various embodiments, the changes in height from step 326 are processed for calculating a vehicle load for the vehicle 100. In various embodiments, this is also performed by the processor 142 of FIG. 1.

Also in various embodiments, the sub-process of FIG. 3 then terminates at step 328, and the process 200 returns to FIG. 2.

With reference back to FIG. 2, in various embodiments, during step 220, axle loads are calculated. In various embodiments, during step 220, axle loads are calculated for both front and rear axles 114 of the vehicle 100 of FIG. 1 by the processor 142 of FIG. 1 based on the vehicle load calculations of step 328 of FIG. 3.

With continued reference to FIG. 2, in various embodiments, a tongue weight and vehicle payload are calculated (step 222). In various embodiments, during step 222, the tongue weight and vehicle payload are calculated based on the axle loads of step 220 along with various known vehicle parameters, as set forth in greater detail below in accordance with an exemplary embodiment. In various embodiments, this is performed by the processor 142 of FIG. 1 using separate images from the front underbody cameras 130 (for the front axle load) and from the rear underbody cameras 132 (for the rear axle load), which are utilized in determining front and rear suspension displacements and ultimately for determining the vehicle payload weight and tongue weight, respectively. In various embodiments, the tongue weight and vehicle payload are differentiated, and separate values of tongue weight and vehicle payload are each determined and utilized for vehicle actions, including reporting of the different values to one or more users of the vehicle 100.

Figure 6:
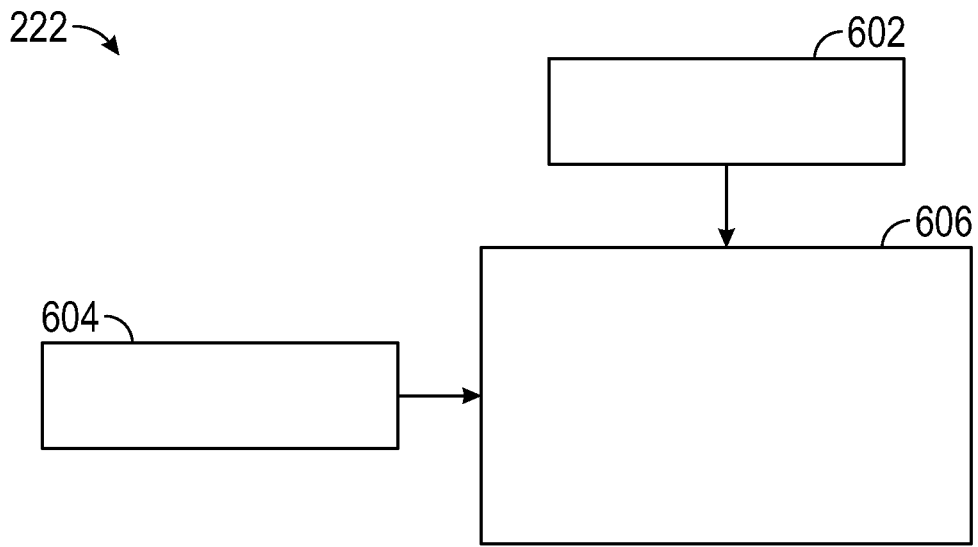
FIG. 6 is a flowchart of a sub-process corresponding to a step of the process of FIG. 2, namely of determining the ride height and payload and tongue weights, in accordance with exemplary embodiments.

With reference to FIG. 6, a flowchart is provided for a sub-process corresponding to step 222 of FIG. 2, namely: the determining of the tongue weight and payload weight for the vehicle.

As depicted in FIG. 6, in various embodiments, changes in front axle loads are determined (step 602). In various embodiments, a change in front axle load ($\Delta F_f$) and a change in rear axle load ($\Delta F_r$) are both calculated for different respective camera images (for different respective points in time). In various embodiments, the processor 142 of FIG. 1 calculates the change in front axle load ($\Delta F_f$) using different front axle load calculations from different images from the front underbody cameras 130 from different points in time during multiple iterations of step 220. Similarly, also in various embodiments, the processor 142 of FIG. 1 calculates the change in rear axle load ($\Delta F_r$) using different rear axle load calculations from different images from the rear underbody cameras 132 from different points in time during multiple iterations of step 220.

Also as depicted in FIG. 6, in various embodiments, known vehicle dimensions are obtained (step 604). In various embodiments, the known vehicle dimensions may include, by way of example, various lengths of the vehicle 100 (including a length "c" between the rear axle 114 and the hitch 11). In various embodiments, other lengths and/or other vehicle dimensions may also be obtained. In certain embodiments, these may be retrieved form the memory 144 of FIG. 1 as stored values 157 thereof.

In various embodiments, the tongue weight and payload weight are determined (step 606). In various embodiments, these determinations are made by the processor 142 of FIG. 1 using the changes in the front and rear axle load values of step 602 in combination with the known vehicle dimensions of step 604.

In certain embodiments, the tongue weight "$F_t$" corresponds to a weight at or proximate the connection (e.g., hitch) 11 of FIG. 1 that connects the vehicle 100 and the trailer 101 of FIG. 1. In various embodiments, the tongue weight "$F_t$" is calculated in step 606 in accordance with the following equation (Equation 6):

$$F_t = -\frac{l}{c}\Delta F_f$$

Also in various embodiments, the payload weight "$F_{Load}$" corresponds to a weight on or proximate the rear axle 114 of the vehicle 100 of FIG. 1. In various embodiments, the payload weight "$F_{Load}$" is also calculated in step 606, in accordance with the following equation (Equation 7):

$$F_{Load} = \Delta F_r + \Delta F_f\left(1 + \frac{l}{c}\right)$$

in which the parameter "c" represents the distance between the rear axle 114 and the hitch 11 of the vehicle 100.

Figure 7:
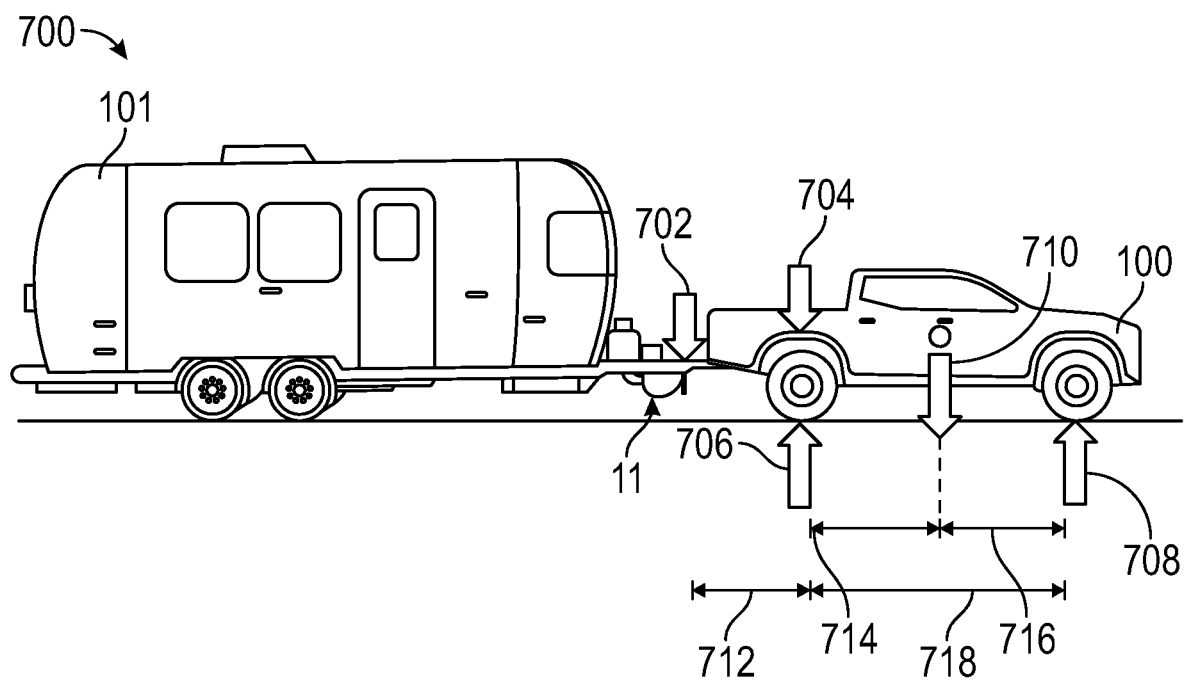
FIG. 7 depicts an implementation of the process of FIG. 2, including the sub-process of FIG. 7, in accordance with exemplary embodiments.

With reference to FIG. 7, an exemplary illustration 700 is provided illustrating an exemplary implementation of the sub-process of FIG. 6 and various values calculated therein. Specifically, FIG. 7 depicts the vehicle assembly 10 of FIG. 1, including the vehicle 100 and the trailer 101 thereof and the connection 11 therebetween.

With continued reference to FIG. 7, the tongue weight $F_t$ 702 is depicted, and is exerted downward on or proximate the connection 11 between the vehicle 100 and the trailer 101. FIG. 7 also depicts the vehicle payload weight $F_{Load}$ 704 exerted downward against a rear axle of the vehicle 100. In addition, FIG. 7 also depicts a change in rear axle load $\Delta F_r$ exerted upward against the rear axle of the vehicle 100, along with a front axle load $\Delta F_f$ 706 exerted upward against a front axle of the vehicle 100. In addition, FIG. 7 also depicts a weight "W" 710 exerted downward against a center portion (or center of gravity) of the vehicle 100.

Moreover, FIG. 7 also depicts different applicable distances for the vehicle, including: (i) distance "c" 712 between the rear axle 114 of the vehicle 100 and the connection (e.g., hitch) 11 between the vehicle 100 and the trailer 101; (ii) distance "b" 714 between the center of gravity of the vehicle 100 and the rear axle 114; (iii) distance "a" 716 between the front axle 114 and the center of gravity of the vehicle 100; and (iv) distance "l" 718 between the front and rear axles 114 of the vehicle, in accordance with an exemplary embodiment.

With reference back to FIG. 2, in various embodiments, one or more strategies are implemented (step 224). In various embodiments, the processor 142 implements one or more control strategies for controlling the vehicle 100 based on the calculated values, including the ride, height, tongue weight and the vehicle payload weight. In certain embodiments, one or more notifications are provided for a driver or other user of the vehicle 100 based on and/or including the calculated values. In certain embodiments, one or more additional HMI (human-machine-interface) strategies may also be implemented by the processor 142 based on the calculated values. In certain embodiments, the processor 142 may provide instructions for control of the vehicle, for example by implementing one or more different driving modes for handling and implementing driver instructions for the brake system 106, the steering system 108, and/or the drive system 110, among other possible implementations for controlling movement and/or operation of the vehicle via instructions provided by the processor 142 based on the calculated values (including the ride height, tongue weight and the vehicle payload weight). Also in various embodiments, the values of ride height, tongue weight, and vehicle payload weight are each reported for one or more users of the vehicle 100 (e.g., via one or more visible displays, audible displays, electronic messages, or the like).

In various embodiments, the process then terminates (step 226).

Accordingly, methods, systems, and vehicles are provided for determining ride height, tongue weights and vehicle payload weights for vehicles. In accordance with exemplary embodiments disclosed herewith, camera images are obtained from underbody vehicle cameras and are processed and utilized, along with other sensor data, to determine the ride height, tongue weights and vehicle payload weights for vehicles based on the steps and techniques disclosed herewith. In various embodiments, the calculated values are also reported to the driver or other users of the vehicle, and may also be used in controlling movement of the vehicle, HMI strategies, and/or other control actions for the vehicle and/or for the trailer coupled thereto.

It will be appreciated that the systems, vehicles, and methods may vary from those depicted in the Figures and described herein. For example, the vehicle 100 of FIG. 1, the control system 102 and the braking system 106 thereof, the trailer 101, and/or components may vary in different embodiments. It will similarly be appreciated that the steps of the process 200 may differ from that depicted in FIG. 2, and/or that various steps of the process 200 may occur concurrently and/or in a different order than that depicted in FIG. 2. It will similarly be appreciated that the subprocesses and implementations of FIGS. 3-9 may differ from those depicted in FIGS. 3-9 and/or as described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining camera images from one or more underbody cameras of a vehicle;
   performing image processing for the camera images, via a processor of the vehicle; and
   determining a ride height, a measure of weight on the vehicle, or both, via the processor, based on the camera images from the one or more underbody cameras and the processing thereof via the processor.

2. The method of claim 1, further comprising:
   controlling a vehicle action, via instructions provided by the processor, based on the determining of the ride height, the measure of weight on the vehicle, or both.

3. The method of claim 1, wherein the camera images comprise:
   front camera images obtained from a front underbody camera of the vehicle and capturing a front axle of the vehicle; and rear camera images obtained from a rear underbody camera of the vehicle and capturing a rear axle of the vehicle.

4. The method of claim 3, further comprising:
determining, via the processor, a front suspension displacement from the processing of the front camera images; and
determining, via the processor, a rear suspension displacement from the processing of the rear camera images;
wherein the step of determining the measure of weight on the vehicle comprises differentiating between a payload weight and a tongue weight for the vehicle based on the front suspension displacement and the rear suspension displacement.

5. The method of claim 4, further comprising:
obtaining additional sensor data from one or more additional sensors of the vehicle;
wherein the image processing is performed via the processor using the additional sensor data in combination with the camera images.

6. The method of claim 1, further comprising:
performing a health check for the one or more underbody cameras, via the processor, based on a comparison of the camera images, as processed via the processor, with one or more baseline images stored in a computer memory.

7. The method of claim 1, further comprising:
performing, via the processor, vehicle frame extraction using the camera images and a baseline image stored in memory, as part of the processing of the camera images;
performing, via the processor, tire ground patch extraction using the camera images, also as part of the processing of the camera images; and
calculating, via the processor, a height between a frame of the vehicle and the tire ground patch based on the vehicle frame extraction and the tire ground patch extraction;
wherein the measure of weight on the vehicle is determined using the height between the frame of the vehicle and the tire ground patch.

8. A system comprising:
one or more underbody cameras for a vehicle and configured to obtain camera images under the vehicle; and
a processor for the vehicle, the processor coupled to the one or more underbody cameras and configured to at least facilitate:
performing image processing for the camera images; and
determining a ride height, a measure of weight on the vehicle, or both, based on the camera images from the one or more underbody cameras and the processing thereof via the processor.

9. The system of claim 8, wherein the processor is configured to at least facilitate:
controlling a vehicle action, via instructions provided by the processor, based on the determining of the ride height, the measure of weight on the vehicle, or both.

10. The system of claim 8, wherein the one or more underbody cameras comprise:
a front underbody camera of the vehicle configured to obtain front camera images capturing a front axle of the vehicle; and
a rear underbody camera of the vehicle configured to obtain rear camera images capturing a rear axle of the vehicle.

11. The system of claim 10, wherein the processor is further configured to at least facilitate:
determining a front suspension displacement from the processing of the front camera images;
determining a rear suspension displacement from the processing of the rear camera images; and
differentiating between a payload weight and a tongue weight for the vehicle based on the front suspension displacement and the rear suspension displacement.

12. The system of claim 11, further comprising:
one or more additional sensors configured to obtain additional sensor data;
wherein the processor is further coupled to the one or more additional sensors and is further configured to at least facilitate performing the image processing using the additional sensor data in combination with the camera images.

13. The system of claim 8, wherein the processor is further configured to at least facilitate:
performing a health check for the one or more underbody cameras, based on a comparison of the camera images, as processed via the processor, with one or more baseline images stored in a computer memory.

14. The system of claim 8, wherein the processor is further configured to at least facilitate:
performing vehicle frame extraction using the camera images and a baseline image stored in memory, as part of the processing of the camera images;
performing tire ground patch extraction using the camera images, also as part of the processing of the camera images;
calculating a height between a frame of the vehicle and the tire ground patch based on the vehicle frame extraction and the tire ground patch extraction; and
determining the measure of weight on the vehicle using the height between the frame of the vehicle and the tire ground patch.

15. A vehicle comprising:
a body;
a drive system configured to move the body;
one or more underbody cameras configured to obtain camera images under the vehicle; and
a processor coupled to the one or more underbody cameras and configured to at least facilitate:
performing image processing for the camera images; and
determining a ride height, a measure of weight on the vehicle, or both, based on the camera images from the one or more underbody cameras and the processing thereof via the processor.

16. The vehicle of claim 15, wherein the processor is configured to at least facilitate:
controlling a vehicle action, via instructions provided by the processor, based on the determining of the ride height, the measure of weight on the vehicle, or both.

17. The vehicle of claim 15, further comprising:
a front axle; and
a rear axle;
wherein the one or more underbody cameras comprise:
a front underbody camera configured to obtain front camera images capturing the front axle; and
a rear underbody camera configured to obtain rear camera images capturing the rear axle.

18. The vehicle of claim 17, wherein the processor is further configured to at least facilitate:
determining a front suspension displacement from the processing of the front camera images;

determining a rear suspension displacement from the processing of the rear camera images; and differentiating between a payload weight and a tongue weight for the vehicle based on the front suspension displacement and the rear suspension displacement.

19. The vehicle of claim 15, wherein the processor is further configured to at least facilitate:

performing a health check for the one or more underbody cameras, based on a comparison of the camera images, as processed via the processor, with one or more baseline images stored in a computer memory.

20. The vehicle of claim 15, wherein the processor is further configured to at least facilitate:

performing vehicle frame extraction using the camera images and a baseline image stored in memory, as part of the processing of the camera images;

performing tire ground patch extraction using the camera images, also as part of the processing of the camera images;

calculating a height between a frame of the vehicle and the tire ground patch based on the vehicle frame extraction and the tire ground patch extraction; and determining the measure of weight on the vehicle using the height between the frame of the vehicle and the tire ground patch.

* * * * *